United States Patent [19]

Jimenez

[11] Patent Number: 4,926,579
[45] Date of Patent: May 22, 1990

[54] SNAG-PROOF SAFETY FISHING LURE

[76] Inventor: Miguel A. Jimenez, P.O. Box 1146, Douglas, Ariz. 85607

[21] Appl. No.: 347,229

[22] Filed: May 3, 1989

[51] Int. Cl.⁵ .............................. A01K 93/00
[52] U.S. Cl. .................... 43/42.44; 43/43.2; 43/43.4; 43/57.1
[58] Field of Search ............ 43/43.1, 34, 35, 37, 43/41, 41.2, 42.22, 42.4, 42.41, 42.42, 42.43, 57.1, 44.9

[56] References Cited

U.S. PATENT DOCUMENTS

| | | | |
|---|---|---|---|
| 1,306,383 | 9/1918 | Lindquist | 43/43.4 |
| 1,437,694 | 12/1922 | Traver | 43/42.1 |
| 2,133,884 | 10/1938 | Barrett | 43/34 |
| 2,195,347 | 9/1939 | Wiard | 43/43.6 |
| 2,424,096 | 7/1947 | Janchan | 43/39 |
| 2,491,182 | 12/1949 | Jaske | 43/49 |
| 2,520,544 | 6/1946 | Hook | 43/43.4 |
| 2,892,283 | 8/1956 | Hudson | 43/44.9 |
| 2,914,883 | 12/1959 | Kustusch | 43/41.2 |
| 3,190,028 | 6/1965 | Mambrin | 43/41.2 |
| 3,303,596 | 2/1967 | Lewis et al. | 43/41.2 |
| 3,680,250 | 8/1972 | Hetrick | 43/54.5 |
| 4,060,925 | 12/1977 | Bias | 43/41.2 |
| 4,433,503 | 2/1984 | Schleif | 43/42.1 |
| 4,534,127 | 8/1985 | Thorvaldsen | 43/41.2 |
| 4,610,104 | 9/1986 | Garcia | 43/41.2 |
| 4,757,637 | 7/1988 | Christensen | 43/57.1 |

Primary Examiner—Nicholas P. Godici
Assistant Examiner—Michael William Starkweather
Attorney, Agent, or Firm—Cahill, Sutton & Thomas

[57] ABSTRACT

A snag-proof safety fishing lure includes a J-shaped hook having a barb at a curved end and an eyelet at the other end. A shield is pivotally connected to a shank of the hook below the eyelet to cover the lure when it is not submerged. When the hook sinks, submersion of the shield is limited to effectively lift the shield from the sinking barb. When the lure is lifted from the water, the weight of the shield causes it to be lowered onto the barb, effectively covering it to prevent snagging.

18 Claims, 2 Drawing Sheets

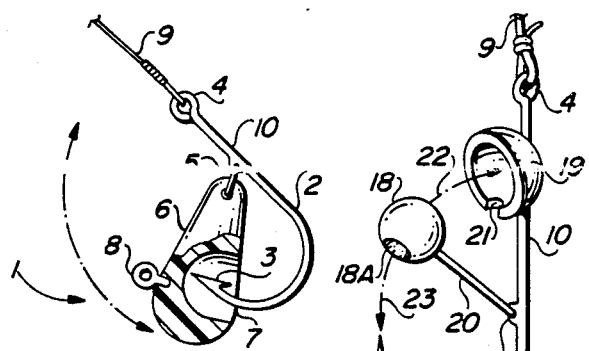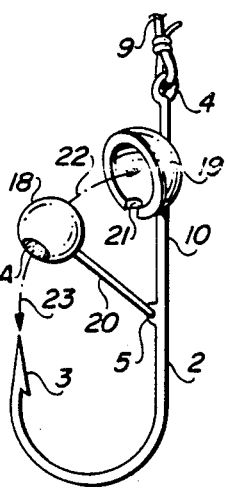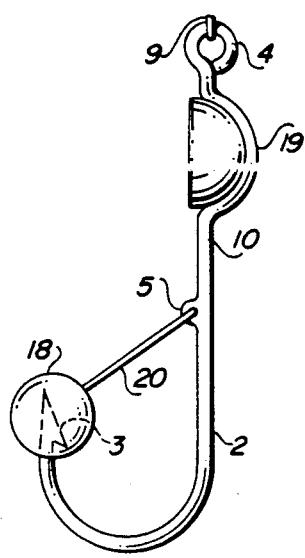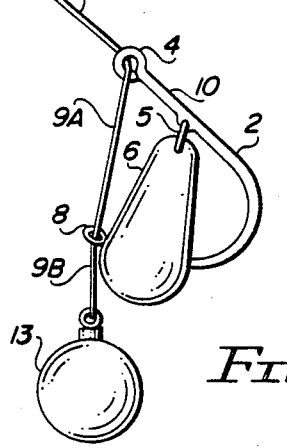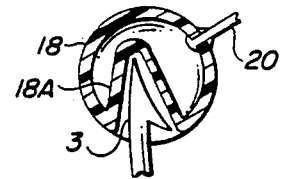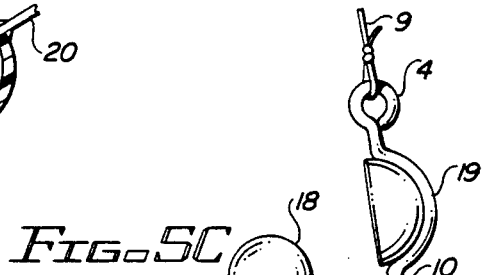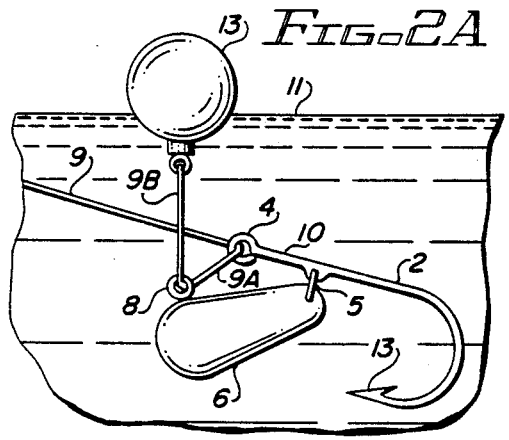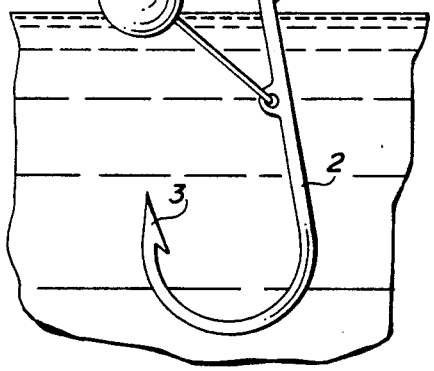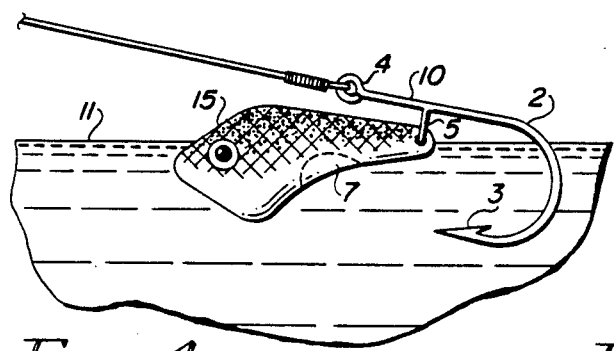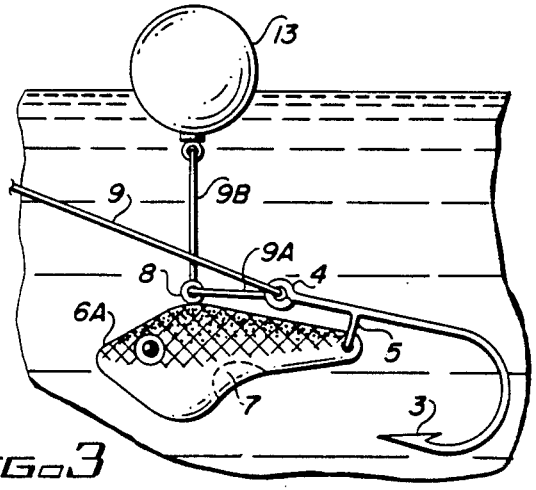

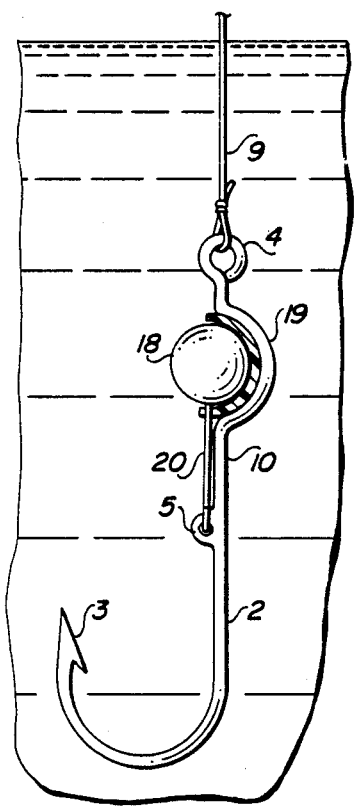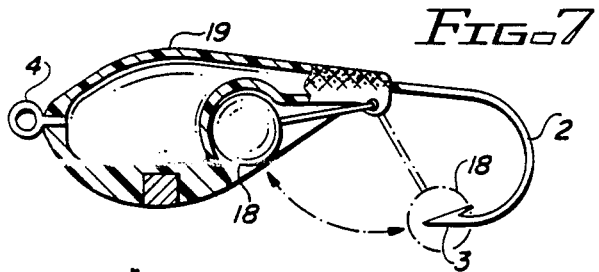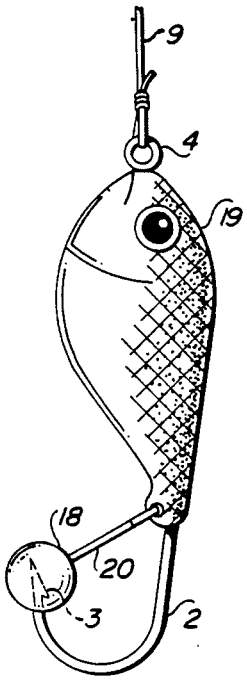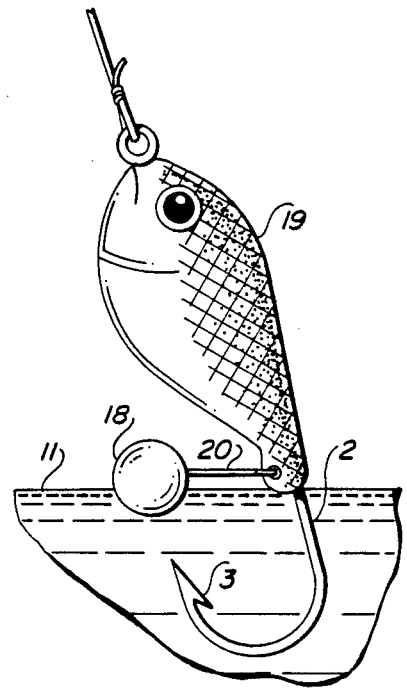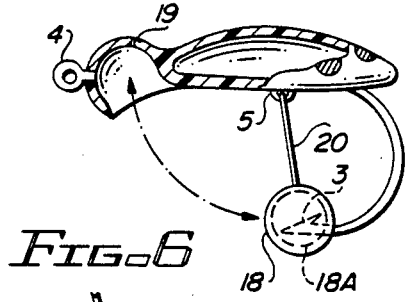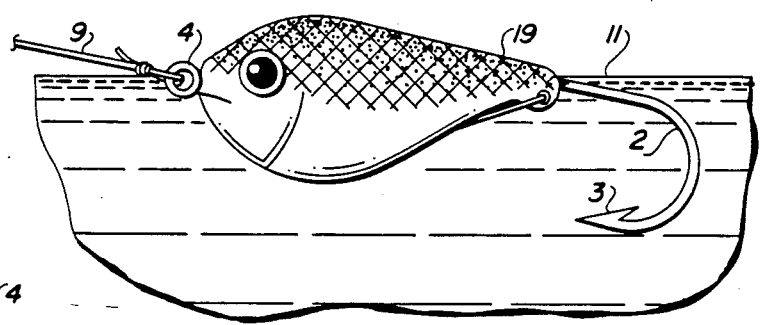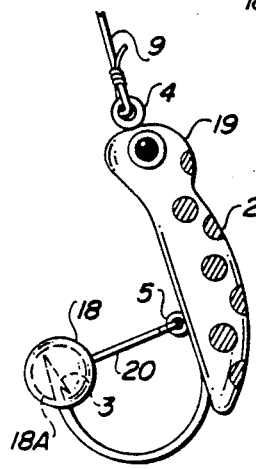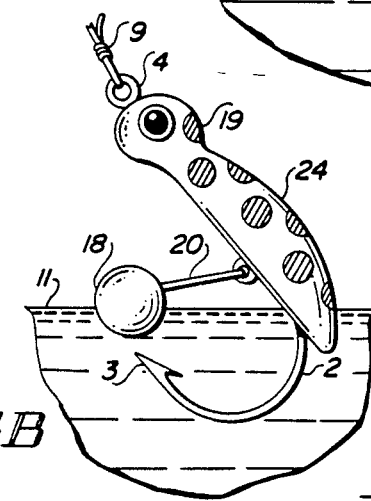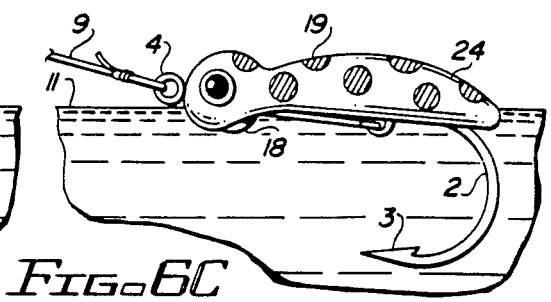

SNAG-PROOF SAFETY FISHING LURE

BACKGROUND OF THE INVENTION

The invention relates to a fishing lure that safely protects the barb of a fishhook from snagging before it is submerged into water and exposes the barb when the lure is submerged.

Although fishing generally is considered to be a safe sport, in fact there are many hazards to fisherman and bystanders. Fishing lures, hooks, and the like are a recognized source of danger, even for experienced, cautious fisherman. The risk obviously is even greater for children, who are naturally curious and often careless. Children are especially vulnerable to injury by fishing lure when they are alone, for example, attempting to attach the barbed hook to a fishing line, or when they are observers, crowding up too close to another person or child who is handling lures or casting them into the water. Snagging of lures on clothing or nearby foliage is a frustration that most fishermen have experienced.

Fishing lures generally include a barbed, baited hook, a float, and a "decoy[ to attract fish. When the lure is cast into the water, the baited and/or decoyed hook sinks until balanced by the float. Various fishing lure devices known in the prior art are intended primarily to protect the bait; such bait guards sometimes incidentally provide protection from the barb of the fishhook. None of the prior safety fishing lures has a structure which shields the barb of a hook when it is out of the water and automatically uncovers the hook for normal use when it is submerged.

Thus, there is an unmet need for an economical, uncomplicated, snag-proof safe fishing lure.

SUMMARY OF THE INVENTION

It is an object of the present invention to provide a safe fishing lure that can effectively attract fish.

It is another object of the present invention to provide a fishing lure that automatically shields the barb of a hook when the hook is removed from the water and exposes the hook when the hook is submerged.

It is another object of the present invention to provide a fishing lure that provides the safety needed for fisherman of all ages and experience, without reducing its effectiveness as a lure.

Briefly described and in accordance with one embodiment of the invention, the invention provides a snag-proof fishing lure that safely protects the barb of a hook from snagging when out of water and exposes the barb when the lure is submerged. The lure includes a J-shaped hook having a barb at its curved end and an eyelet at the other end. A shield for covering the lure when it is not submerged is pivotally connected to a shank of the hook below the eyelet. When the hook sinks, submersion of the shield is limited so as to effectively lift the shield from the sinking barb. When the lure subsequently is removed from the water, the weight of the shield causes it to be pivotally lowered to cover the barb. The shield can be formed in a shape useful for attracting fish so as to serve as a decoy.

BRIEF DESCRIPTION OF THE DRAWINGS

FIG. 1 is an elevational view of a first embodiment of the fishing lure of the present invention.

FIG. 2 is an elevational view of a float attached to the fishing lure of FIG. 1.

FIG. 2A is an elevational view of the float and fishing lure of FIG. 2 submerged in water.

FIG. 3 is an elevational view of a second embodiment of the invention.

FIG. 4 is an elevational view of a third embodiment of the invention, partially submerged in water.

FIG. 5 is a perspective view of another embodiment of the invention.

FIG. 5A is a partial section view useful in describing the embodiment of FIG. 5.

FIGS. 5B-D are elevational views useful in describing the embodiment of FIG. 5.

FIG. 6 is a partial section view of another embodiment of the invention.

FIGS. 6A-C are elevational view illustrating the operation of the embodiment of FIG. 6.

FIG. 7 is a partial section view of another embodiment of the invention.

FIG. 7A-C are elevational views illustrating the operation of the embodiment of FIG. 7.

DETAILED DESCRIPTION OF THE PREFERRED EMBODIMENTS

Referring to FIGS. 1, 2, and 2A, a snag-proof fishing lure 1 includes a J-shaped hook 2 having a barb 3 at the end of the J-shaped section and a shank 10 leading up from the J-shaped section to an eyelet 4 at the opposite end. A hinge 5 pivotally attaches a shield 6 to the shank 10. Shield 6 contains a recess 7 to cover barb 3 when it is not submerged. An eyelet 8 is attached to the outside of shield 6 in back of recess 7. Fishing line or string 9 attached to a rod and reel (not shown) passes through eyelets 4 and 8, and is attached to float 13.

Hinge 5 allows shield 6 to pivot up or down, depending on whether or not lure 1 is submerged Hinge 5 prevents "sideways" movement of shield 6 to prevent unintended exposure of barb 3 when it is not submerged. When safety lure 1 is removed from the water, gravity causes shield 6 to pivot about hinge 5 down onto barb 3 in recess 7, thereby protecting barb 3 from snags. When safety lure 1 is submerged in water, the water pressure forces shield 6 to pivot up away from barb 3, thus exposing the barb 3 to fish.

FIG. 2A illustrates safety lure 1 submerged in water. When lure 1 is cast from a rod and reel by a fisherman, shield 6 submerges in water 11 and float 13 floats on top of the water Line 9A passes through eyelet 4 and eyelet 8. Line 9B is attached to float 13 and pulls up on shield 6, causing it to pivot upward on hinge 5, thereby removing barb 3 from recess 7 and allowing it to function normally to hook a fish. The weight of shield 6 can pull it and hook 2 deeper into the water, thus playing out line 9, while float 13 remains on water surface 11. However, the weight of shield 6 must be low enough that line 9B, attached to float 13, can exert sufficient force to pivot shield 6 upward to expose barb 3 for fishing.

In the embodiment of the invention shown in FIG. 3, shield 6 of FIG. 1 $\propto$ 2A has been replaced by decoy 6A, which is in a shape useful to attract fish. Decoy 6A contains recess 7 for engaging barb 3 when safety lure 26 is removed from the water. The embodiment illustrated in FIG. 3 functions in a manner similar to the embodiment shown in FIGS. 1-2A.

FIG. 4 illustrates a third embodiment of the invention in which the separate float and shield elements of FIGS. 1, 2, 2A, and 3 have been combined and given an appearance to decoy fish. However, unlike the earlier embodiments, shield/float 15 is not attached to line 9.

When combined shield/float 15 is cast into water 11, its buoyancy causes it to pivot on hinge 5 so as to expose the submerged barb for catching fish. When the lure is pulled out of the water, its weight causes the shield/float 15 to pivot down to engage barb 3 in recess 7.

In another embodiment of the invention shown in FIGS. 5 and 5A-C, a shield/float 18 having therein a protective recess 18A is connected to arm 20, which is pivotally connected to shank 10 by hinge 5. As in the earlier embodiments, hinge 5 allows shield/float 18 to pivot up and down relative to the hook, and prevents "sideways" pivoting of the shield/float 18. A receptacle 19 attached to shank 10 below eyelet 4 receives shield/float 18 therein when the shield/float pivots in the direction shown by arrow 22 to its extreme upward position on hinge 5. Shaft 20 is accommodated by notch 21 when shield/float 18 is in receptacle 19. As shown in FIG. 5A, recess 18A covers barb 3 when shield/float 18 is pivoted downward onto hinge 5.

FIG. 5C illustrates shield/float 18 floating on the surface of water 11, with hook 2 submerged near the water surface 11. FIG. 5D shows hook 2 and shield/float 18 completely submerged, so that the upward force of the water pivots shield/float 18 all the way upward into receptacle 19. When the lure is removed from the water, the weight of shield/float 18 pivots it downward to protectively cover barb 3 by means of recess 18A as illustrated in FIG. 5B.

FIGS. 6 and 6A-C illustrate another similar embodiment of the invention wherein receptacle 19 is formed within a decoy 24, to hopefully attract fish.

FIGS. 7 and 7A-C illustrate another similar embodiment of the invention.

While the invention has been described with reference to several particular embodiments thereof, those skilled in the art will be able to make the various modifications to the described embodiments of the invention without departing from the true spirit and scope of the invention. For example, a weak spring can be provided to urge the shield to a "closed" position over the barb when the lure is not submerged.

What is claimed is:

1. A snag-proof fishing lure comprising in combination:
    (a) a J-shaped hook having a barb at a curved end thereof and a first eyelet at a shank end thereof;
    (b) a shield having a recess in a lower surface thereof to cover the barb when the lure is not submerged;
    (c) means positioned below the first eyelet for pivotally connecting the shield to a shank of the hook; and
    (d) floatation means associated with the shield as the hook sinks in water to effectively lift the shield to expose the barb.

2. The snag-proof fishing lure of claim 1 wherein the submersion limiting means includes a float, the snag-proof fishing lure further comprising a second eyelet spaced from the pivotal connecting means and connected to an upper surface of the shield, and a fishing line connected to the float and passing through the first and second eyelets, whereby the float effectively lifts the shield to expose the barb as the hook sinks.

3. The snag-proof fishing lure of claim 1 wherein the shield and the submersion limiting means are integral.

4. The snag-proof fishing lure of claim 1 wherein the shield and submersion limiting means are separate.

5. The snag-proof fishing lure of claim 1 further comprising decoy indicia on the shield.

6. The snag-proof fishing lure of claim 1 wherein the shield is shaped to form a decoy.

7. The snag-proof fishing lure of claim 1 further including means for decoying fish.

8. The snag-proof fishing lure of claim 7 wherein the decoying means is attached to the shank.

9. The snag-proof fishing lure of claim 7 wherein the decoying means is attached to the shield.

10. The snag-proof fishing lure of claim 1 wherein the shield pivots up and down relative to the hook so that when the lure is not submerged the shield pivots to cover the barb, and when the lure is submerged the submersion limiting means pivots the shield up from the barb, exposing the barb.

11. The snag-proof fishing lure of claim 10 wherein the pivotal connecting means restrains the shield from pivoting sideways relative to the hook.

12. A snag-proof fishing lure comprising in combination:
    (a) a J-shaped hook having a barb at a curved end thereof and an eyelet at another end thereof;
    (b) shield means for covering the barb when the lure is not submerged;
    (c) means positioned below the eyelet for pivotally connecting the shield means to a shank of the hook; and
    (d) floatation means associated with the shield means as the hook sinks in water to effectively lift the shield from the barb.

13. The snag-proof fishing lure of claim 12 wherein the shield means can pivot up and down relative to the hook so that when the lure is not submerged the force of gravity pivots the shield down over the barb, and when the lure is submerged the submersion limiting means pivots the shield means up from the barb, exposing the barb to the fish.

14. The snag-proof fishing lure of claim 13 wherein the pivotal connecting means restrains the shield means from pivoting sideways relative to the hook.

15. The snag-proof fishing lure of claim 14 wherein the shield means and the submersion limiting means are integral.

16. The snag-proof fishing lure of claim 14 wherein the shield means and the submersion limiting means are separate.

17. The snag-proof fishing lure of claim 14 further including a receptacle attached to the shank beneath the first eyelet to receive the integral shield means and the submersion limiting means when it pivots upward to an extreme position as the lure is submerged.

18. The snag-proof fishing lure of claim 12 wherein the shield means is shaped as a decoy.

* * * * *